No. 868,400. PATENTED OCT. 15, 1907.
P. A. BONIS.
RAIL CLAMP.
APPLICATION FILED APR. 29, 1907.
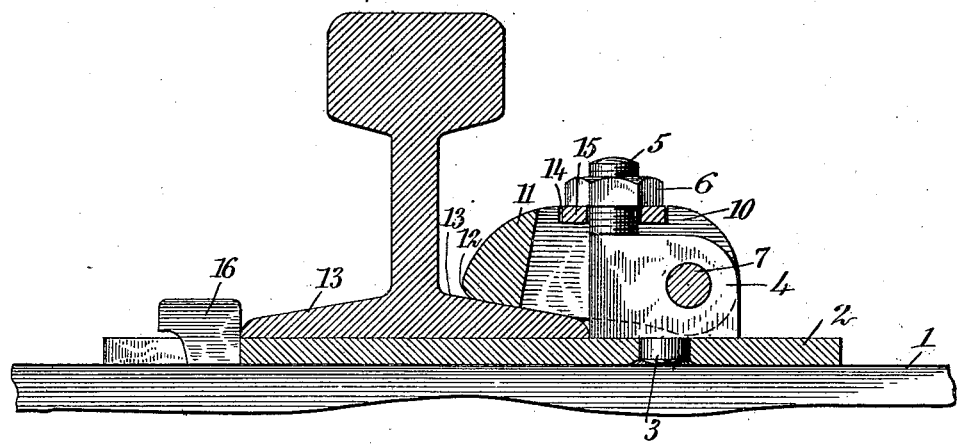
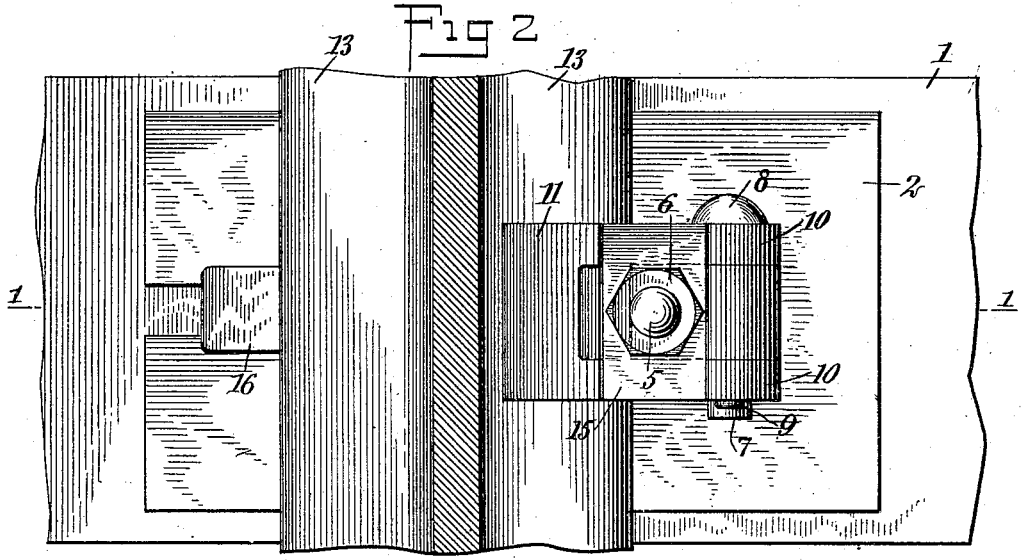
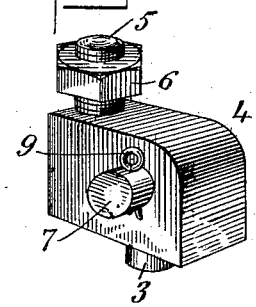
WITNESSES
E. G. Bromley
R. W. Hardie
INVENTOR
Paul A. Bonis
BY Munn & Co.
ATTORNEYS

UNITED STATES PATENT OFFICE.

PAUL A. BONIS, OF NEW YORK, N. Y., ASSIGNOR OF ONE-THIRD TO STATHIS LAMPRO, OF NEW YORK, N. Y.

RAIL-CLAMP.

No. 868,400.  Specification of Letters Patent.  Patented Oct. 15, 1907.

Application filed April 29, 1907. Serial No. 370,830.

*To all whom it may concern:*

Be it known that I, PAUL A. BONIS, a subject of the King of Greece, and a resident of the city of New York, (borough of Manhattan,) in the county and State of New York, have invented a new and Improved Rail-Clamp, of which the following is a full, clear, and exact description.

This invention has for its object to provide means simple in construction, effective in operation and durable in use, adapted to enable a rail to be securely held on its supporting ties, and to be readily applied thereto or detached therefrom.

Other objects relating to the specific construction and special arrangement of the parts will be understood from the following description and accompanying drawings, in which Figure 1 is a transverse section, partly in elevation, on the line 1—1 of Fig. 2 of a device embodying my invention. Fig. 2 is a plan of a device embodying my invention applied to the base flange of a rail; and Fig. 3 is a perspective view of a detail of said device.

Like characters of reference designate corresponding parts in all the views.

As illustrated in the drawings, 1 represents a railway tie supporting a base-plate 2 provided on one end with an aperture designed to receive a stud 3 formed on the lower portion of a head 4 and adapted to be up-ended so as to rivet said head on to the base-plate. The head 4 is also provided with a stud screw 5 having a threaded engagement with a nut 6.

A hinge pin 7 extends transversely of the head 4 in an aperture formed therein, one end of the pin being provided with a head 8 and the opposite end with a spring key 9 seated in an aperture extending transversely of said hinge pin. The hinge pin extends also through the ends of side walls 10 of a clamp, which are spaced apart and connected at their free ends by means of a cross bar 11, thereby forming a yoke inclined on the under surface 12 of its inner end and adapted to bear against the inclined base flange 13 of a rail.

The walls 10 of the clamp are provided with recesses 14 adapted to receive a bearing plate 15, the bearing plate being provided with an aperture adapted to receive the threaded stud 5 supporting the nut 6 mounted on said stud.

An abutment of any suitable construction may be applied to the opposite portion of the base flange of the rail and consists preferably of a spike 16 which extends through an aperture formed in the base plate 2 and into the tie 1, the inner edge of the abutment or spike bearing against the edge of the base flange of the rail.

The device is applied by placing the bed-plate 2 on a tie with one of the edges of the base flange 13 bearing against the head 4. The hinged clamp is then swung over the threaded stud 5 and on to the base flange 13, and the bearing plate 15 placed in position on the side walls 10 of the clamp with the threaded stud 5 projecting upward through said plate to receive the threaded nut 6 which is then screwed tightly upon the stud 5 so as to exert a strong clamping pressure on the base flange of the rail. A plurality of clamps already described may be applied to the rail and arranged in staggered relation to each other so that the clamps of adjacent ties are arranged alternately against the inner and outer portion of the base flange of a rail.

What I claim as new and desire to secure by Letters Patent is:

1. A rail clamp comprising a base plate, an abutment, and a yoke hinged to the base plate and adapted to bear against the base flange of a rail, and means for locking said yoke in position.

2. A rail clamp comprising a bed-plate having an abutment, a head secured to said base-plate and provided with a threaded stud, a yoke pivoted to said head, a bearing plate extending transversely of said yoke and engaging said stud, and means for clamping said yoke on the base flange of a rail.

3. A rail clamp comprising a base plate having an abutment connected therewith, a head having a stud fixedly secured to said base plate, and a threaded stud extending vertically from said head, a yoke pivoted to said head and provided with recesses on its upper portion, a bearing plate seated in said recesses provided with an aperture engaging said threaded stud, and a nut secured to said threaded stud.

In testimony whereof I have signed my name to this specification in the presence of two subscribing witnesses.

PAUL A. BONIS.

Witnesses:
 ROBERT W. HARDIE,
 JOHN P. DAVIS.